Sept. 12, 1961 J. G. CRUMP 2,999,591
CONTAINER INSPECTION SYSTEM
Filed Oct. 23, 1958 2 Sheets-Sheet 1
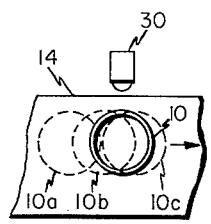
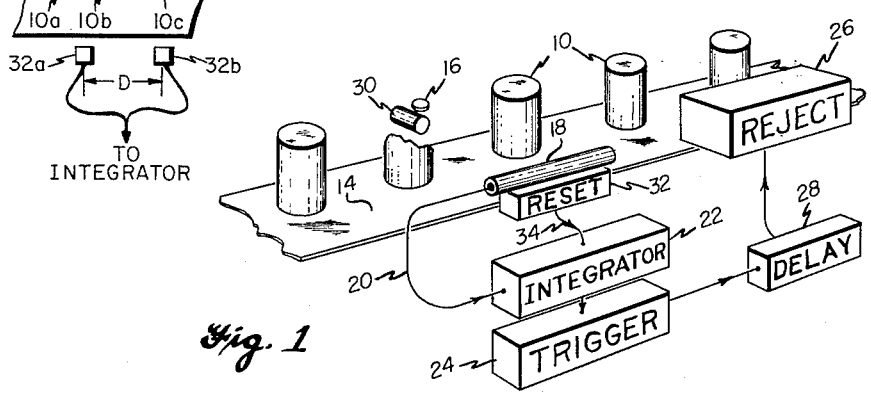
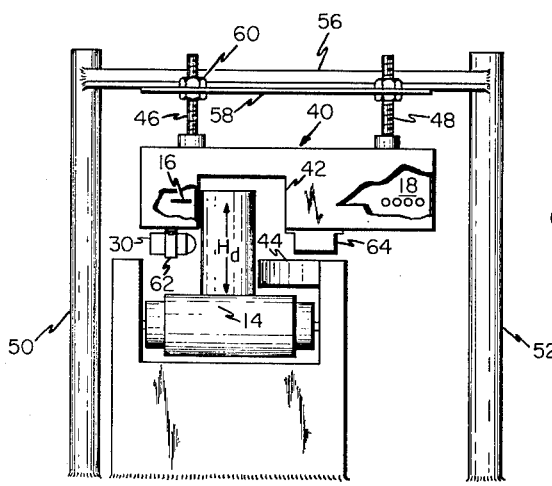
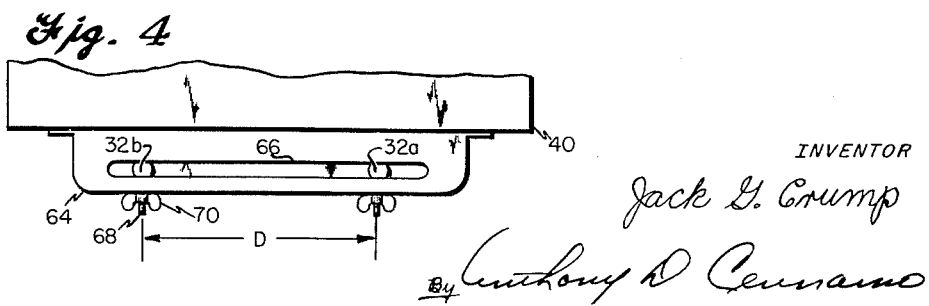
INVENTOR
Jack G. Crump
By Anthony D. Cennamo Sept. 12, 1961 J. G. CRUMP 2,999,591
CONTAINER INSPECTION SYSTEM
Filed Oct. 23, 1958
2 Sheets-Sheet 2
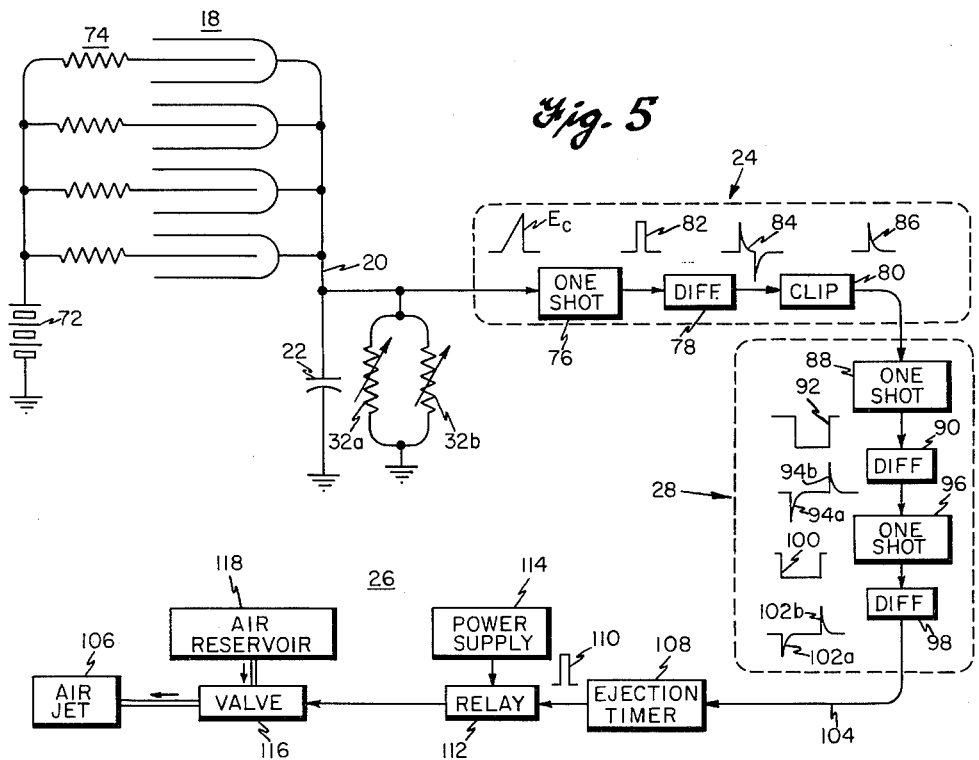
Fig. 5
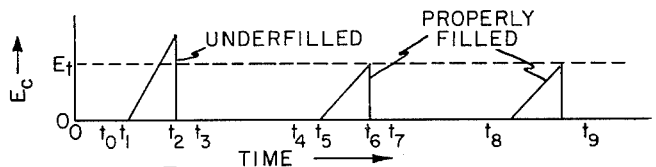
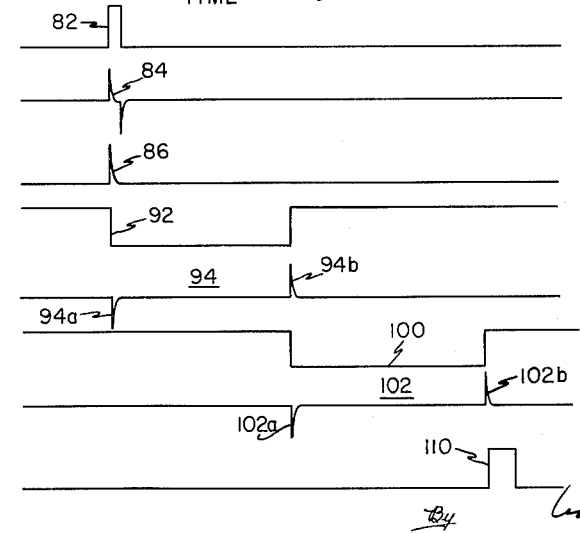
Fig. 6
INVENTOR
Jack G. Crump
Anthony D. Cennamo
By United States Patent Office 2,999,591
Patented Sept. 12, 1961

2,999,591
CONTAINER INSPECTION SYSTEM
Jack G. Crump, Columbus, Ohio, assignor to Industrial Nucleonics Corporation, a corporation of Ohio
Filed Oct. 23, 1958, Ser. No. 769,161
6 Claims. (Cl. 209—82)

This invention relates to container inspection and rejection systems and more particularly to a high speed container inspection and rejection system wherein successive filled containers are individually inspected and classified in accordance with the height of fill material therein.

Many industries are currently engaged in providing a product which is packaged in suitable containers for convenience of shipping and handling. These packaged products usually contain a quantity of material which has been deposited in empty containers by dispensing apparatus of various types. Depending on the particular application, the fill material may range from liquids of varying density to solid substances in powdered or granular form. Quite often, after a quantity of material has been placed in a given container, the latter is sealed so as to preserve the contents enclosed therein.

In order to maintain customer satisfaction and to comply with various Federal and State regulations, it is imperative that each container include a specified minimum amount of material. Container inspection is therefore necessary for classification purposes in order to eliminate all short-filled containers.

Prior to the present invention, there have been various methods utilized to measure the quantity of fill material in individual containers. One method makes use of a weighing device mounted subsequent to the container filling apparatus to determine the weight of each container. A container rejection apparatus is also employed and is responsive to the weigher for removing all containers not having a minimum weight. Due to the slow response of the mechanical weighing devices as well as various other shortcomings, this system is limited to relatively slow packaging lines using intermittent conveyors.

Within recent years certain industries have found it necessary to install high speed packaging lines to cope with the increasing demands for their products. Rapid container feeding and material dispensing machinery are coupled with continuous conveyor networks to achieve increased production approaching 1200 units per minute.

In applications of this nature where the time for container inspection is reduced to milliseconds, nuclear radiation devices are required to determine the fill level of the individual containers. The rejection devices are then arranged to respond to increases in detected radiation intensity, i.e., a reduction in container fill level. Since a space is commonly provided between adjacent containers on the conveyor line, a gating device must be employed to prevent actuation of the reject mechanism between successive containers. Before the present invention, a complex network of electronic gates controlled by a mechanical microswitch was required to provide this gating signal. In addition, preamplifiers, phase detectors and numerous pulse lengthening circuits were needed to achieve satisfactory performance. Inasmuch as proper performance of the system depended upon moving mechanical parts subject to wear as well as upon numerous electronic components inclined to malfunction, a considerable amount of time and expense was involved in servicing.

In order to overcome the difficulties of the aforementioned prior art, the present invention provides a radiation source and detector disposed at opposite sides of a conveyor at a predetermined level. An integrator serially connected to the radiation detector is controlled by a novel reset device disposed in non-contacting relationship with each container for periodically developing a potential in accordance with the amount of current flowing in said detector. The integrator reset device responds to the presence of a container between the radiation source and detector so that a rejection pulse is developed only during the time a container is centrally positioned with regard to the radiation source and detector. The integrated pulses are admitted to suitable rejection means for actuating the same when the amplitude of the pulses exceeds a preset level. If the fill height of a given container falls below the level affixed by the predetermined physical elevation of the source and detector, that container is subsequently eliminated from the processing line.

Accordingly, it is a primary object of the present invention to provide an inspection and rejection system for removing under-filled containers from a high speed production line.

It is another object of the present invention to provide an improved container inspection and rejection system which accurately determines the full height of individual containers and rejects the same upon the basis of that determination.

It is an additional object of the present invention to remove from a high speed production line substantially all those containers whose fill heights are slightly less than a predetermined level.

It is also an object of the present invention to provide a means for varying the time interval of container inspection.

It is a still further object of the present invention to provide an inspection and rejection system which may be easily adapted either to reject under-filled containers or to reject over-filled containers.

It is a further object of the present invention to provide a high speed container inspection and rejection system which is simpler in operation and substantially less complex, circuit-wise, than similar devices used heretofore.

Yet another object of the present invention is to provide a container inspection and rejection system whose operation is controlled by the product itself.

It is yet another object of the preesnt invention to provide an inspection and rejection system which is controlled and directed by a sensing unit having no moving mechanical components subject to wear.

The foregoing objects as well as numerous other objects and features of the present invention will become apparent upon reference to the following specification taken in conjunction with the accompanying drawings wherein:

FIG. 1 is a simplified perspective view, partly diagrammatic, of a container inspection and rejection scheme in accordance with the teachings of the present invention;

FIG. 2 is a simplified partial top view of the inspection apparatus shown in FIG. 1;

FIG. 3 is an end plan view of a typical inspection apparatus embodying the principles illustrated in FIG. 1 and showing the mounting bracket and height adjusting means therefor;

FIG. 4 is a front elevation of the light sensing unit of the apparatus in FIG. 3;

FIG. 5 is a schematic drawing partly diagrammatic illustrating the operation of the present invention;

FIG. 6 is a waveform diagram depicting the time-wise relationship of the various voltages of FIG. 5.

To generally illustrate the present invention, reference may be taken specifically to FIG. 1 showing apparatus for inspecting containers 10 in order to determine whether or not the same are filled to a desired level. The inspection apparatus is not restricted to a particular type of container nor is it limited to the detection of insufficiently filled containers. It may alternately be employed to detect containers that are filled above a desired level. As shown in FIG. 1, the container 10 may comprise a metal can commonly used for liquid products such as oil, insect sprays, beer or other products. The containers 10 may be carried on any suitable support means operative to transport the container to and through the inspection station such as a conveyor 14. Individual containers 10 are generally separated, in industrial practice, from one another and are transported at a constant linear velocity by the conveyor 14.

At a certain desired height above the conveyor 14, there is placed a source of penetrative radiation 16. An electrical detector responsive to nuclear radiation such as a Geiger-Müller tube 18 is placed on the opposite side of the conveyor 14 also at the desired height. The G-M tube 18 may be mounted parallel to the conveyor 14 and to the line of travel of containers 10. A conductor 20 serves to couple the output of the G-M tube 18 to an integrator 22 which is in turn connected to a trigger network shown generally at 24. A container rejection device 26 is disposed subsequent to the inspection station and for controlling the initiation and the duration of the integration period. The view shown in FIG. 2 illustrates the manner in which this is accomplished. When a container 10, moving in the direction indicated, reaches the dotted position 10a it breaks the flow of light energy to a first photosensitive element 32a. At the instant the container attains the position 10b light energy is removed from a second photosensitive element 32b. As soon as light energy is excluded from both photosensitive elements 32a and 32b, the integrator 22 begins to totalize the G-M tube current. This current summing process continues until the container 10 reaches the moved position 10c allowing light energy to strike the photosensitive element 32a thereby resetting the integrator 22. The relative spacing D between the photosensitive elements 32a and 32b determines the time duration of container measurement. As the distance D is increased, the period of integration is decreased and vice versa. It may therefore be desirable to provide adjusting means for varying the distance D in order to accurately measure the fill height of containers of different diameter. Although a single light source and dual photosensitive elements are employed, dual light sources and a single photosensitive element may be utilized to achieve the same purpose. At the risk of a reduction in signal-to-noise ratio it is possible to utilize a single light source and a single photodetector in order to obtain satisfactory performance.

The inspection apparatus including the radiation source 16, detector 18, light generator 30 and light detecting elements 32a and 32b is preferably mounted at a fixed elevation with respect to the conveyor 14 in order to gauge the fill level of a series of identical containers. It may, however, be coupled through suitable delay means 28 to the triggering circuit 24. An integrator reset device comprises a light source 30 mounted under the radiation source 16 and an electronic resetter disposed at the detector side of the conveyor 14 and generally indicated at 32. Resetter 32 is responsive to light energy from the source 30 for producing an integrator reset signal. A conductor 34 serves to couple the reset signal to the integrator 22.

The integrator 22 functions to sum the total G-M tube current to develop an electrical potential across the terminals of said integrator. It is apparent that the G-M tube 18 would conduct heavily during periods between successive containers due to the absence of absorber between radiation source 16 and the G-M tube 18. Pulsing of the G-M tube 18 with no absorber between containers would negate any attempt to correlate the integrated G-M tube output to container fill height. It is the purpose of the light source 30 and reset unit 32 to alternately initiate and disable the integrator 22 so that a potential is developed which is in accordance with the fill height of each container 10.

Accordingly, if it is assumed that a given container is insufficiently filled, an integrated potential will be developed whose amplitude is large enough to pulse the delay circuit 28 via the trigger 24. The delay circuit 28 acts to retard actuation of the container rejector 26 until such time that the underfilled container has cleared the inspection station.

To confine the measurement of each container to a centralized portion in order to achieve an optimum signal-to-noise ratio, the present invention provides a method and means desirable to provide for the vertical adjustment of said inspection apparatus where it is necessary to accommodate different containers, or containers in which the desired fill level changes from time to time. For an illustration of the mechanical construction utilized to mount the components described above, reference may now be had to FIG. 3. A generally rectangular stainless steel housing 40 is fabricated with an undercut channel 42 extending the length of the housing 40. The containers 10 are guided through the housing 40 by a conventional side rail 44 mounted slightly above the conveyor 14 to slideably engage the curved surface of the containers. The housing 40 is laterally displaced with respect to the conveyor 14 so that the containers 10 pass as close as physically possible to the radiation source 16 positioned on one side of the channel 42. The radiation source 16 may comprise a thin wafer of a radioisotope such as cesium 137.

In practice, a plurality of G-M tubes 18 may be employed as a radiation detector by parallel connecting each so as to increase the signal output. These, of course, may be mutually coplanar and placed on the alternate side of the channel 42. It should be noted that the plane described by the radiation source 16 and G-M tubes 18 is positioned at a predetermined elevation above the conveyor 14. This predetermined elevation is designated by $H_d$ and is hereinafter referred to as a fill height. A more complete description of the radiation source and detector herein briefly illustrated is given in my copending application for U.S. Letters Patent Serial No. 730,347, filed April 23, 1958, for Measuring System.

Extending upwardly from the housing 40 and securely fastened thereto are threaded studs 46 and 48. A pair of stanchions 50 and 52 are base mounted at either side of the conveyor 14 at the inspection station. A rigid cross member 56 is positioned above and parallel to the conveyor 14 and welded to the stanchions 50 and 52. The cross member 56 carries a mounting plate 58 having holes drilled therein to receive the threaded studs 46 and 48 of the housing 40. Locknuts at 60 may be provided to secure the housing 40. With this mounting arrangement, it may be seen that the vertical displacement of the housing 40 with respect to the conveyor 14 may be varied by adjusting the locknuts 60 to allow for any desired fill height $H_d$. If desired, a third threaded stud may be added to maintain stability of the housing 40.

The integrator reset components are preferably mounted upon the underside of the housing 40. A pilot lamp 30 may be clamped to the housing 40 by a curved steel strap 62 so that the lens of said lamp diffuses light toward the opposite side of the conveyor 14 where the photosensitive elements 32a and 32b are enclosed by a cover 64 bolted to the underside of the housing 40.

Referring to FIG. 4, it may be observed that the cover 64 bears a transparent window 66 facing the lamp 30 and extending substantially along the longitudinal dimension of the cover 64. The window 66 may be constructed of glass or other material capable of transmitting light energy. In registry with the window 66 are placed the sensitized surfaces of the photosensitive elements 32a and 32b which, in the preferred embodiment, comprise electrically identical photoresistors. Each photoresistor includes a mounting stud 68 and wing nut 70. A slot may be cut in the underside of the cover 64 to accommodate the studs 68. This slot may extend substantially the same length as the window 66 to enable the relative spacing D of the photoresistors 32a and 32b to be varied. For a given container diameter, since the spacing of the photoresistors determines the period of integration as well as the portion of container measured, the distance D should be adjusted to yield an optimum signal to noise ratio.

Inasmuch as an adequate explanation of the operation of the radiation source and detector may be found in the copending application cited hereinabove, only a brief interpretation is considered necessary in this disclosure. Accordingly, a fine beam of radiation is passed through the containers 10 at the desired fill height $H_d$. The container walls and the fill material absorb a portion of this radiant energy according to the total mass traversed by the radiation beam. As a result, a substantially attenuated beam of radiation strikes the G-M tubes 18 causing current flow therein. The amount of detector current is directly proportional to the radiation intensity striking the G-M tubes 18 and is therefore inversely related to the mass cross-sectional area of the absorber. Thus, it may be observed that a decrease in the quantity of fill material in containers 10 effects a corresponding increase in G-M tube current and vice versa.

To effectively explain the manner in which the integrator 22 is controlled by the photoresistors 32a and 32b, reference is made to FIG. 5. In this figure, a source of positive potential represented by the battery 72 is applied to a plurality of parallel connected G-M tubes 18 each having an isolating resistor 74. Line 20 couples the G-M tubes 18 to an integrating capacitor 22 having a time constant of substantially longer duration than the time of individual container measurement. The alternate electrode of capacitor 22 is connected to ground in common with the cathode return for the battery 72. Photoresistive elements 32a and 32b are parallel connected across the terminals of the capacitor 22 and exhibit an extremely high impedance when light energy is excluded from their sensitized surfaces. Alternately, if light energy strikes either photoresistor a considerable reduction in impedance occurs thereacross. It should be herein noted that other types of photodetectors may be utilized, but the fast response of photoresistors is exceedingly desirable in high speed container inspection applications.

In the operation of the integrating network of FIG. 5, it may be observed that an insufficiently filled container 10 passing through the inspection head 40 will be scanned by the radiation beam. Current will be conducted through the G-M tubes 18 in accordance with the intensity of impinging radiation. Light energy to the first photoresistor 32a is removed by the intervening container 10 but the G-M tube output is still grounded by the "short" exhibited by photoresistor 32b. Substantially no signal potential is developed across the capacitor 22. This condition prevails until the container 10 has progressed sufficiently to obstruct light from the second photoresistor 32b. At the instant that the second photoresistor 32b is darkened, its impedance increases to such an extent that for all practical purposes it may be regarded as an "open circuit." Simultaneously the capacitor 22 begins to charge according to the total current flow through the G-M tubes 18. An electrical potential $E_c$ appears across the terminals of the capacitor 22 relative to the fill height of a predetermined cross-sectional area of the given container 10. This method of fill height determination is extremely accurate provided the time constant of the integrating network is much longer than the period of measurement. After the desired time for measurement has elapsed, light energy is transmitted from the lamp 30 toward the first photoresistor 32a to effectively short the capacitor 22. The capacitor 22 is then reset to prepare the same for measurement of the next container 10. It will be appreciated that the response of the electronic integrator resetter is substantially faster than mechanical switching devices as well as certain photocell arrangements.

The integrated potential $E_c$ is applied to the trigger circuit 24 comprising a series connection of a one shot multivibrator 76, a differentiating circuit 78 and a pulse clipper 80. The bias on the one shot 76 is adjusted to maintain said one shot in a static condition. If the positive-going pulse $E_c$ is of sufficient amplitude to overcome the aforesaid bias, regenerative flip flop action occurs and a positive-going square wave pulse 82 is generated. Pulse 82 is differentiated at 78 and its resulting wave shape is illustrated at 84. The clipper 80 discards the negative-going portion of pulse 84 and delivers a positive pulse 86 corresponding to the leading edge of the pulse 82 to the delay circuit 28 enclosed in the dotted outline.

In practice, the point of container rejection may be ideally fixed as close as physically possible to the point of container inspection and in a typical installation the spacing thereof may be equivalent to the linear distance measured between alternate containers 10. Accordingly, a specific amount of rejection delay must be provided in order to permit under-filled containers to clear the inspection housing 40 before their removal from the conveyor 14 is effected. It is the primary purpose of the delay 28 to store the pulse 86 until the objectionable container is positioned in registry with the ejection mechanism.

Although many types of signal delay devices, well known to those skilled in the art, may be utilized at 28, a conventional monostable multivibrator 88 and associated differentiator 90 may be serially connected as shown. One shot 88 produces a negative-going square pulse 92 whose leading edge is coincident with the leading edge of pulse 86. The differentiator 90 delivers an output pulse 94 having a negative-going portion 94a and a positive-going portion 94b corresponding respectively to the leading and trailing edges of the square pulse 92. Pulse 94b is in turn applied to another one shot multivibrator 96 connected to a differentiator 98. The one shot 96 is operative to produce a square wave pulse 100 having a leading edge coincident with that of the pulse 94b and having a time duration identical to that of pulse 92. One shots 88 and 96 are designed to produce square pulses whose duration is equivalent to the length of time of travel between each container 10 and the succeeding. A differentiated pulse 102 is formed at 98 including a negative-going portion 102a and a positive-going portion 102b corresponding respectively to the leading and trailing edges of the square pulse 100. The output of the differentiator 98 may then be coupled by means of line 104 to suitable rejection apparatus 26.

Various mechanical and pneumatic means may be provided to eject the containers 10 and one method which has been commercially successful utilizes an air jet 106 mounted adjacent the container line. In this manner, a blast of air is directed across the conveyor 14 against the side of an improperly filled container 10 whereby said container is blown laterally from the conveyor into suitable reject cartons. To this end, an ejection timer 108 which may comprise a one shot multivibrator in a conventional embodiment produces a square rejection pulse 110 in response to the positive-going pulse 102b applied to its input. Rejection pulse 110 controls the on time of a relay 112 through which power is transmitted to a solenoid valve 116 from a power supply 114. The solenoid operated valve 116 is energized by the supply 114 concomitantly with the leading edge of the rejection pulse 110 whereupon air contained under pressure in a reservoir 118 is admitted to the air jet 106. It may be observed that the duration of the air blast is determined solely by the ejection timer 108. It should also be noted that the use of multivibrators for the trigger, delay and ejection timing circuits afford numerous advantages over prior art devices wherein preamplifiers, phase detectors and complex delay and control apparatus are employed to perform similar functions.

In order to more clearly understand the operation of the rejection pulse delay circuit 28, reference may be had to FIG. 6. In FIG. 6, the integrated voltage $E_c$ is graphically plotted against time. Assuming a substantially constant linear velocity of the containers through the inspection head 40 and a constant spacing between successive containers, the waveform of the voltage across capacitor 22 appears as illustrated. At time $t_0$ an underfilled container 10 enters the radiation beam and at a later time $t_3$ emerges from the scanning beam and travels toward the rejection point. At some predetermined time $t_1$, after $t_0$, integration is initiated and continues until time $t_2$ at which point the capacitor 22 is "shorted" out by the photoresistor 32a. However, during the integration period $t_1-t_2$, $E_c$ will exceed the bias or triggering level $E_t$ of the one shot multivibrator 76 which level is depicted by the dotted line.

A second container may be assumed to be properly filled to height $H_d$ and to enter and exit the radiation beam at times $t_4$ and $t_7$ respectively. Measurement of the second container occurs between times $t_5$ and $t_6$ and is equivalent to the time interval $t_1-t_2$. Since the radiation intensity at the G-M tubes 18 will be considerably less than that encountered during the first container, the amplitude of the integrated pulse $E_c$ will be reduced to a value essentially equivalent to the triggering level $E_t$.

Continuing with this example, it may be seen that a third container will be scanned during the interval $t_8$ to $t_9$ within which time the integrated voltage $E_c$ may have an amplitude approaching the trigger level $E_t$. It may be observed that neither of the latter two pulses exceeds the triggering level $E_t$.

In the diagram of FIG. 6, pulses 82, 84, 86, 92, 94, 100, 102 and 110 of FIG. 5 are arranged to correspond time-wise with the integrated pulses $E_c$ plotted thereabove. At the instant the voltage integrated for the first container exceeds the triggering level $E_t$, the trigger pulse 82 initiates the delay pulse 92. The amplitude of the pulse 92 drops to zero when the second container is being measured. The second delay pulse 100 generated by the trailing edge of pulse 92 exists until the third container is centrally disposed relative the radiation source 16 and G-M tubes 18 at which time the amplitude of pulse 100 approaches zero potential. Inasmuch as the first container is situated immediately adjacent the air jet 106 when the third container is being inspected, the fall of the delay pulse 100 generates the reject pulse 110 in the ejection timer 108 to automatically eliminate the first container from the conveyor output. Properly filled containers, of course, may be delivered from the inspecting and rejecting stations to the discharge terminal of the conveyor. It will be understood from the foregoing that the apparatus described above may be, in an alternate embodiment, employed to reject all containers 10 filled above the desired height $H_d$. The necessary modifications will be familiar to those skilled in the art; therefore an explanation of said operation is herein omitted.

Accordingly, it is thought that the invention and its attendant advantages will be fully understood from the foregoing description. In addition, whereas the disclosure set forth comprises a preferred embodiment of the present invention, numerous changes, additions and omissions may be made in the form, construction and arrangement of the component elements thereof without departing from the spirit and scope of said invention, or sacrificing any of the attendant advantages.

What is claimed is:

1. In a measuring system for determining at least one physical property of a plurality of spaced containers traveling at a substantially constant rate, apparatus comprising a transducer defining an inspection path across the path of said containers for generating a signal proportional to said physical property, means connected to said transducer for integrating said signal, means for enabling said integrating means whenever a container reaches a first position in said inspection path, and means for disabling said integrating means when said container reaches a second position in said inspection path to confine said time interval of signal integration to a period of time less than that required for said container to transit said inspection path.

2. The apparatus substantially as set forth in claim 1 which further includes means for utilizing said integrated signal.

3. In a measuring system for determining at least one physical property of a plurality of spaced containers traveling at a substantially constant rate, apparatus comprising a transducer defining an inspection path across the path of said containers for generating an electrical signal proportional to said physical property, a capacitive element connected to said transducer for integrating said electrical signal, a variable resistive element connected in parallel circuit relationship with said capacitive element, means for substantially increasing the impedance of said resistive element relative to said capacitive element when said container reaches a first position in said inspection path, and means for substantially reducing the impedance of said resistive element relative to said capacitive element when said container reaches a second position in said inspection path.

4. The apparatus substantially as set forth in claim 2 which further includes means connected to said capacitive element for utilizing said integrated electrical signal.

5. In a measuring system for determining at least one physical property of a plurality of spaced containers traveling at a substantially constant rate, apparatus comprising a transducer defining an inspection path across the path of said containers for generating an electrical signal proportional to said physical property, a capacitive element connected to said transducer for integrating said electrical signal, a source of light radiation, means for mounting said light source at one side of said container path in vertical alignment with said transducer, a pair of spaced photoresistive elements mounted at the opposite side of said container path from said light source, means for connecting said photoresistive elements in parallel circuit relationship with said capacitive element, means for rendering the impedance of said photoresistive elements large with respect to said capacitive element whenever a container reaches a first position in said inspection path to enable said signal integration and negligible with respect to said capacitive element when said container reaches a second position in said inspection path to disable said signal integration operation, and means connected to said capacitive element for utilizing said integrated electrical signal.

6. In a measuring system for determining at least one physical property of a plurality of spaced containers traveling at a substantially constant rate, apparatus comprising a transducer defining an inspection path across the path of said containers for generating an electrical signal proportional to said physical property, a capacitive element connected to said transducer for integrating said electrical signal, a source of light radiation, means for mounting said light source at one side of said container path in vertical alignment with said transducer, a pair of spaced photoresistive elements mounted at the opposite side of said container path from said light source, means for connecting said photoresistive elements in parallel circuit relationship with said capacitive element, means for rendering the impedance of said photoresistive elements large with respect to said capacitive element whenever a container reaches a first position in said inspection path to enable said signal integration and negligible with respect to said capacitive element when said container reaches a second position in said inspection path to disable said signal integration operation, means for adjusting the relative spacing of said photoresistive elements to vary the time interval between said integration enabling and disabling operations.

References Cited in the file of this patent

UNITED STATES PATENTS

| | | |
|---|---|---|
| 2,142,920 | Rose | Jan. 3, 1939 |
| 2,529,081 | Hughes et al. | Nov. 7, 1950 |
| 2,732,503 | Jacobs | Jan. 24, 1956 |